United States Patent [19]
Haszeldine et al.

[11] 3,816,277
[45] June 11, 1974

[54] PREPARATION OF FLUOROALKANE SULPHIDES
[76] Inventors: Robert Neville Haszeldine, Windyridge Lyme Rd., Disley; Anthony Edgar Tipping, 19 Canberra Rd., Bramhall, both of England
[22] Filed: July 18, 1972
[21] Appl. No.: 272,829

[30] Foreign Application Priority Data
Aug. 6, 1971 Great Britain.................... 37118/71

[52] U.S. Cl. .......................... 204/158 R, 260/609 R
[51] Int. Cl......................... B01j 1/10, C07c 149/14
[58] Field of Search............. 204/158 R; 260/609 R

[56] References Cited
UNITED STATES PATENTS
3,008,966    11/1961    Hauptschein et al............... 204/158

OTHER PUBLICATIONS
Kogyo Kagaku Zasshi, Vol. 72 (1969), pp. 114–120, (cited page A2 English Abstract).

Primary Examiner—Howard S. Williams

[57] ABSTRACT

A fluorinated iodoalkane is reacted with a dialkyl sulfide or dialkyl disulfide to prepare a fluoroalkyl sulfide. An optional, additional reactant is an alkali metal alkane thiolate. The fluoroalkyl sulfides are readily converted to fluoroalkyl sulfonic acids which are useful as surfactants and corrosion inhibitors.

15 Claims, No Drawings

PREPARATION OF FLUOROALKANE SULPHIDES

This invention relates to the preparation of fluoroalkyl sulphides, especially poly-and perfluoroalkyl sulphides, involving the reaction of a fluorinated iodoalkane with a dialkyl sulfide or a dialkyl disulfide.

Methyl polyfluoroalkyl sulphides have been prepared by various methods which include the ionic addition of methanethiol to fluoroolefins as described by R. C. Terrel, T. Ucciardi and J. F. Vitcha, in U.S. Pat. No. 3,476,812 and J. Org. Chem., 1965, 30, 4011, and the free-radical addition of methanethiol to fluoroolefins as described by J. F. Harris and F. W. Stacey, J. Amer. Chem. Soc., 1961, 83, 840. The article by Terrell, Ucciardi and Vitcha further discloses the fluorination of the intermediate methyl polyfluoroalkyl sulphide giving rise to methyl perfluoroalkyl sulfides. Methyl perfluoroalkyl sulphides have also been prepared by the fluorination of methyl perchloroalkyl sulphides as described by F. Boberg, G. Winter and G. R. Schultze, Annalen, 1959, 691, 8 and W. E. Truce, G. H. Birun and E. T. McBee, J. Amer. Chem. Soc., 1952, 74, 3594, but this latter method has only been reported for the preparation of methyl trifluoromethyl sulphide.

Perfluoroalkane sulphonic acids have been prepared hitherto by the electrochemical fluorination of alkane sulphonyl chlorides and fluorides, as described in U.S. Pat. No. 2,732,398 (see also T. Gramstad and R. N. Haszeldine, J. Chem. Soc., 1957, 2640–5) or cyclic sulphones, formed by reaction of sulphur dioxide with substituted buta-1, 3-dienes, as described in German Pat. application No. P 19 12 738, followed by hydrolysis of the resulting perfluoroalkane sulphonyl fluorides. Perfluoropropane-2-sulphonyl fluoride can also be prepared by the fluoride-ion catalysed reaction of hexafluoropropene with sulphuryl fluoride, as described in British Pat. No. 1,189,562. In an alternative method diacids can be prepared by reaction of alkyl disulphides, RS.SR (R = alkyl), with tetrafluoroethylene to give telomers of formula RS (CF$_2$CF$_2$)$_n$ SR which can be oxidised via the bis-sulphones, to the corresponding disulphonic acids as described in U.S. Pat. No. 3,346,606 (see also U.S. Pat. No. 2,443,003).

The present invention is based on the discovery of a novel reaction for the preparation of fluoroalkyl sulphides which opens up a convenient route to the preparation of fluoroalkyl sulphonic acids. According to this reaction fluoroalkyl sulphides are prepared by reacting a fluoroiodoalkane with a dialkyl sulphide or a dialkyl disulphide, the reaction medium optionally containing as an additional reactant to obtain a faster reaction, an alkali metal alkanethiolate. The reaction may be represented as follows:

(1) R$_f$I + R.S.R.    or    R.S.S.R. → R$_f$S.R.

or, when an alkali metal alkanethiolate is present:

(II) R$_f$I + RSM $^-$+ R.S.R.    or R.S.S.R. → R$_f$S.R.

where R$_f$ represents a fluoroalkyl or fluoroiodoalkyl radical, R represents an alkyl radical and M is an alkali metal. In reaction (II) the R groups in the alkali metal alkanethiolate and the dialkyl sulphide or disulphide will usually correspond. In the case where R$_f$ is a fluoroiodoalkyl radical, the resulting sulphide will be polyfunctional depending on the number of iodine atoms present in the fluoroiodo radical.

The radical R$_f$ is preferably a poly- or perfluoroalkyl or a poly- or perfluoroiodoalkyl radical containing one to 30 carbon atoms or more, the most preferred products being those where R$_f$ is a poly- or perfluoroalkyl radical containing one to 15 carbon atoms. The radical R$_f$ may be straight chain or branched chain, or it may be cyclic, the expression "alkyl" used herein being inclusive of cycloalkyl unless the context requires otherwise. The carbon atom(s) bearing the iodine substituent(s) can be of primary, secondary or tertiary configuration.

The prefix "fluoro" or "polyfluoro" as used herein is not to be taken as excluding other substituents in the alkyl group inert under the conditions of the reaction. Typical of other substituents which may be present in the reactant fluoroiodoalkane are hydrogen, chlorine, perfluoroalkoxy, etc.

Examples of reactant fluoroiodoalkanes which may be used in the process of the invention to produce fluoroalkyl sulphides are: CF$_3$I, CF$_3$·CF$_2$I, CF$_3$·CF$_2$·CF$_2$I, (CF$_3$)$_2$CFI, (CF$_3$)$_3$CI, CHF$_2$·CF$_2$I, CF$_2$CL·CF$_2$I, CF$_2$Cl·CF CH, CF$_3$·CFClI, (CF$_3$)$_2$CF·CF$_2$I, (CF$_3$)$_2$CF·CF$_2$·CF$_2$I, Cl(CF$_2$CF$_2$)$_n$I, H(CF$_2$·CF$_2$)$_n$I, I(CF$_2$·CF$_2$)$_n$I, CF$_3$·(CF$_2$·CF$_2$)$_n$I, CF$_3$·CF$_2$(CF$_2$·CF$_2$)$_n$I, (CF$_3$)$_2$CF$_2$·CF$_2$)$_n$I, where $n$ is an integer (1, 2, 3, 4, 5, etc.), and polyfluorocycloalkyl iodides, e.g.,

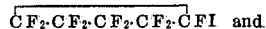 and

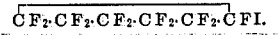

The alkyl substituent R in the sulphide or disulphide and alkanethiolate reactants may contain from one to six carbons or more; however, it is preferred that R be lower alkyl because when the fluoroalkyl sulphide product is used as an intermediate in the preparation of fluoroalkyl sulphonic acids via oxidation of the sulphide to the corresponding sulphone, best results are obtained when R is lower alkyl, most preferably methyl.

Reaction I above may be carried out either under thermal or photochemical conditions. Thermal reactions can be carried out under "sealed reactor" conditions or in a "flow-through" system. For sealed tube reactions, the temperature range may be about 160°C to 200°C with 160° to 185°C being preferred. Such reactions are best carried out in sealed systems in vacuo, which must, of course, be able to withstand the autogenous pressures generated. For flowthrough reactions temperatures of 150°–500°C are used, preferably from 300°–450°C. Preferred pressures are 1–760 mm Hg, more preferably 50–700 mm Hg. Contact times will usually range from 0.5 sec. – 5 minutes, preferably 1–100 seconds.

Photochemical reactions which involve irradiation with ultraviolet light are best carried out in the temperature range 25° to 100°C, especially 40° to 50°C, although lower or higher temperatures may be used. The reactants are desirably sealed in vacuo in a Pyrex or silica tube, preferably the latter, designed to withstand the pressures generated. The reactions may be carried out under static conditions or better with mild agitation. Irradiation is best effected with the reaction tube kept at a distance of from 5 cm to 20 cm from the ultraviolet lamp. Both thermal and photochemical reactions can be carried out using a molar ratio of R$_f$I:R$_2$S or R$_2$S$_2$ of between 1:100 and 100:1 with 1:2 to 1:10 preferred.

Under conditions favouring photochemical reaction, yields of 80 percent and better of the desired sulphide can be obtained, while under conditions favouring thermal reaction the yields are somewhat lower.

Reaction II above, which is best suited to poly- and perfluoro-iodoalkyl reactants, is best carried out in a sealed system in vacuo under thermal conditions, temperatures of 50° to 150°C, particularly 70° to 120°C, being preferred. At lower temperatures the reaction is either impracticably slow or does not take place. Temperatures in excess of 150°C give increased yields of undesirable by-products at the expense of the desired sulphide.

The reaction can be effected using a molar ratio of alkanethiolate to fluoroiodoalkane in the range 0.1:1 to 10:1 or greater, but preferably in the range 1:1 to 2:1. Similarly, the ratio of dialkyl disulphide or sulphide to fluoroiodoalkane can be in the range of 0.1:1 to 20:1 or greater, but preferably in the range 2:1 to 10:1.

Reaction II is also best carried out in the presence of an aprotic solvent, preferably dimethyl sulphoxide, diglyme or tetraglyme, but this is not to be taken as excluding other solvents, or the absence of solvent for the reaction mixture. The solvent volume can be widely varied, and for reactions employing from 5 to 25 mmol of fluoroiodoalkane the solvent volume can be in the range 2 to 100 ml or greater, but preferably in the range 5 to 20 ml; reactions employing larger quantities of reactant fluoroiodoalkanes require appropriately larger amounts of solvent. The reaction time is dependent on the reactivity of the fluoroiodoalkane, but times in the range 10 to 100 hours are generally required to ensure a high conversion to desired sulphide.

Under such conditions yields of 70 percent and better of the desired sulphide can be obtained, although chain branching in the iodoalkane, particularly branching on the same carbon as, or adjacent carbon to, the iodine substituent, affords somewhat lower yields of the sulphide.

The alkyl fluoroalkyl sulphides, particularly the alkyl perfluoroalkyl and alkyl polyfluoroalkyl sulphides obtained by the above reactions, are useful as solvents and as chemical intermediates for preparing further useful products. They can be converted by conventional methods into the corresponding sulphoxides, sulphones, trichloromethyl sulphones and sulphonic acids or salts derived therefrom. The methyl perfluoroalkyl or polyfluoroalkyl sulphones and the corresponding trichloromethyl analogues are stable materials useful as dielectrics and solvents.

As already indicated, the novel reactions of the present invention open up a route for the preparation of the fluoroalkyl sulphonic acids. This route utilizes three steps of which the first step comprises either of Reactions (I) or (II), the second comprises oxidising the product sulphide to the corresponding sulphone which can then be converted in a third step to the corresponding acid recoverable in free acid or salt form. The complete reaction scheme is as follows, R, $R_f$ and M having the values previously assigned. As previously stated, R is preferably methyl in this series of reactions.

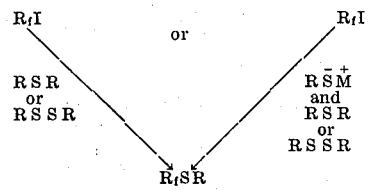

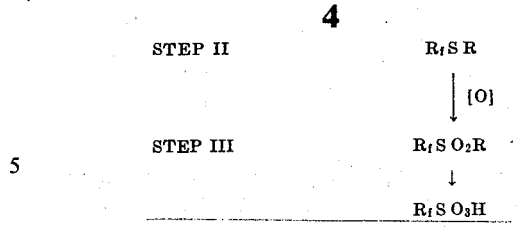

Step I of the above scheme has already been described. Step II is carried out by conventional methods, for example, by reaction with potassium permanganate in glacial acetic acid or with hydrogen peroxide (100 vol). The sulphone may be recovered by ethereal extraction.

In Step III the sulphones may be converted into a sulphonic acid salt either directly, by reaction with neutral alkali metal permanganate solution, or by conversion into the corresponding trichloromethyl sulphones by reaction with sodium hypochlorite, followed by alkaline hydrolysis preferably in the presence of a solvent such as dioxane.

Such conditions apply where R is methyl. More severe conditions may be required where R is other than methyl.

As will be appreciated, the product of Step III will be an alkali metal salt of the desired acid, but the salt can be converted quantitatively into the free acid and the free acid recovered by techniques well known in the art.

Lowest acids of the $R_fSO_3H$ series ($R_f=CF_3$, $CF_3 \cdot CF_2$) find use as very strong, non-oxidising stable acids in acid catalysis and as intermediates in chemical synthesis. The potassium salts can be employed as fusible fluxes and bonding agents, and in the molten state, as heat exchange liquids. Higher acids and their salts (particularly sodium and potassium salts) are also useful as chemical intermediates and most importantly as anionic surface active agents (surfactants.) This latter property is most developed when seven or more carbon atoms are present in the chain and n-perfluorooctane sulphonates (eight carbon atoms) are most useful in this respect. The higher acids and their salts are effective in reducing the surface tension of aqueous and certain non-aqueous solutions (e.g., oils and hydrocarbon media) even under strong oxidising or reducing conditions, at elevated temperatures, and in the presence of strong mineral acids or high base concentration. The surface active properties render them suitable (depending on the particular system) as surface tension reducing agents, dispersing agents, emulsifying agents, wetting agents, foaming agents, anti-foaming agents, stabilising agents for emulsions and dispersions, detergents, corrosion inhibitors, fluxes, and surface treating and coating agents. In addition sulphonic acids or the acid halides thereof are useful intermediates for preparing carboxylic acids.

Where $R_f$ in the starting fluoroiodoalkane contains one or more iodine atoms, the resulting polyfunctional sulphides will be convertible into polyfunctional acids.

The preparation of fluoroalkyl sulphides according to the invention and their subsequent conversion into fluoroalkyl sulphonic acids is illustrated by the following Examples.

Examples I to VII show the novel process of this invention for the preparation of alkyl fluoroalkyl sulphides from dialkyl sulphide and fluoroiodoalkanes. Examples VIII to XVII show the novel process for the preparation of such sulphides from dialkyl disulphide and fluoroiodoalkanes.

Examples XVIII to XXV illustrate the novel process of this invention for the preparation of alkyl perfluoroalkyl sulphides from perfluoroiodoalkanes, sodium methanethiolate, and dimethyl disulphide in solvent dimethyl sulphoxide. Examples XXVI to XXIX illustrate the novel process for the preparation of such sulphides in solvent diglyme or tetraglyme. Examples XXX to XXXI illustrate the extension of the process to a polyfluorodiiodoalkane, namely octafluoro-1,4-diiodobutane. Examples XXXII to XXXIV show the novel process of this invention for the preparation of the desired sulphides from perfluoroiodoalkanes, sodium methanethiolate and dimethyl sulphide in solvent dimethyl sulphoxide.

Examples XXXV to XXXVIII illustrate the preparation of alkyl fluoroalkyl sulphones and Examples XXXIX to XLI demonstrate the conversion of such sulphones to the corresponding trichloroalkyl fluoroalkyl sulphones. Example XLII shows the conversion of the methyl perfluoroalkyl sulphone to the potassium salt of the corresponding sulphonic acid and Example XLIII shows the conversion of the perfluoroalkyl trichloromethyl sulphone to the potassium salt of the corresponding sulphonic acid.

The structures of the polyfluoroalkyl and perfluoroalkyl sulphides were determined by elemental analysis, infrared spectroscopy and mass and n.m.r. spectrometry.

EXAMPLE I

Dimethyl sulphide (5.62 g, 90.7 mmol) and trifluoroiodomethane (4.25 g, 21.7 mmol) were sealed in a silica tube (ca. 300 ml) and irradiated for 14 days at a distance of 6 inches from an ultraviolet lamp. The tube was shaken vigorously and the temperature maintained at about 40°–45°C throughout the period of irradiation. At the end of the reaction period the tube was opened and the volatile products separated by fractional condensation in vacuo followed by gas-liquid chromatographic separation of the combined –95° and –78°C fractions. This afforded methyl trifluoromethyl sulphide (1.59 g, 13.7 mmol), in 63 percent yield.

EXAMPLE II

Following the procedure of Example I, a mixture of dimethyl sulphide (5.74 g, 92.4 mmol) and heptafluoro-1-iodopropane (6.31 g, 21.3 mmol) was irradiated for 28 days.

Separation of the products by fractional condensation in vacuo followed by gas-liquid chromatographic separation of the fraction condensing at –78°C gave methyl heptafluoro-n-propyl sulphide (2.30 g, 10.7 mmol, 50 percent) (Found: C,21.9; H,1.4. $C_4H_3F_7S$ requires C, 22.2 percent; H, 1.4 percent) b.p. 61°C.

EXAMPLE III

Following the procedure of Example I, a mixture of dimethyl sulphide (6.52 g, 105 mmol) and heptafluoro-2-iodopropane (8.12 g, 27.4 mmol) was irradiated for 24 days.

Separation of the products, as in Example II, gave methyl heptafluoroisopropyl sulphide (1.47 g, 6.8 mmol 32 percent) (Found: C,22.4; H,1.4. $C_4H_3F_7S$ requires C,22.2; H,1.4 percent) b.p. 61°C.

EXAMPLE IV

Following the procedure of Example I, a mixture of dimethyl sulphide (5.42 g, 87.4 mmol) and 1-chlorotetrafluoro-2-iodoethane (6.24 g, 23.8 mmol) was irradiated for 28 days.

Separation of the products, as in Example II, gave methyl 2-chlorotetrafluoroethyl sulphide (1.96 g, 10.8 mmol 45 percent) (Found: C, 19.8; H, 1.9; F, 42.0; S,17.7. $C_3H_3ClF_4S$ requires C,19.7; H, 1.7; F, 41.6; S, 17.5 percent) b.p. 80°C.

EXAMPLE V

Following the procedure of Example I, a mixture, a mixture of dimethyl sulphide (5.26 g, 84.9 mmol) and pentadecafluoro-1-iodo-5-methyl-hexane (10.29 g, 20.7 mmol) was irradiated for 28 days.

Separation of the products by fraction condensation in vacuo followed by gas-liquid chromatographic separation of the –22°C fraction gave methyl pentadecafluoro-5-methylhexyl sulphide (3.28 g, 7.97 mmol, 46 percent) (Found: C,23.0 H,1.0; F, 68.5; S,7.9. $C_8H_3F_{15}S$ requires C,23.0; H, 0.7; F, 68.6; S,7.7 percent) b.p. 139°C.

EXAMPLE VI

Following the procedure of Example I, a mixture of dimethyl sulphide (6.73 g, 108 mmol) and octafluoro-1,4-diiodobutane (7.90 g, 17.4 mmol) was irradiated for 14 days.

Separation of the products by fractional condensation in vacuo followed by gas-liquid chromatographic separation of the combined –45° and –22°C fraction gave methyl octafluoro-4-iodobutyl sulphide (1.71 g, 4.58 mmol 44 percent) Found:C16,3; 4.08: I,34.3. $C_5H_3F_8IS$ requires C, 16.1; H, 0.8; I, 34.0 percent) and 1,4-bis(methylthio)-octafluorobutane (0.06 g, 0.20 mmol, 2 percent) (Found: C,24.2; H, 2.1; F, 51.5: $C_6H_6F_8S_2$ requires C, 24.5; H, 2.0; F, 51.7 percent) b.p. 183°C.

EXAMPLE VII

Dimethyl sulphide (2.06 g, 33.2 mmol) and heptafluoro-1-iodopropane (3.42 g, 11.5 mmol) were sealed in a pyrex tube (ca.. 300 ml) and heated at 170° (72 hr).

Separation of the products, as in Example II, gave methyl heptafluoro-n-propyl sulphide (0.22 g, 1.02 mmol).

EXAMPLE VIII

Following the procedure of Example I, a mixture of dimethyl disulphide (7.91 g, 84.3 mmol) and heptafluoro-1-iodopropane (4.44 g, 15.0 mmol) was irradiated for 21 days.

Separation of the products, as in Example II, gave methyl heptafluoro-n-propyl sulphide (2.82 g, 13.0 mmol) in 93 percent yield.

EXAMPLE IX

Following the procedure of Example I, a mixture of dimethyl disulphide (11.3 g, 120 mmol) and trifluoroiodomethane (3.02 g, 15.4 mmol) was irradiated for 21 days.

Separation of the products, as in Example I, gave methyl trifluoromethyl sulphide (1.07 g, 14.2 mmol) in 92 percent yield.

EXAMPLE X

Following the procedure of Example I, a mixture of dimethyl disulphide (11.8 g, 126 mmol) and heptafluoro-2-iodopropane (8.44 g, 28.5 mmol) on irradiation for 21 days, afforded methyl heptafluoroisopropyl sulphide (5.12 g, 23.7 mmol) in 83 percent yield.

EXAMPLE XI

Following the procedure of Example I, a mixture of dimethyl disulphide (6.46 g, 68.7 mmol) and 1-chlorotetrafluoro-2-iodoethane (6.80 g, 25.9 mmol) on irradiation for 21 days, gave methyl 2-chlorotetrafluoroethyl sulphide (3.87 g, 21.2 mmol) in 82 percent yield.

EXAMPLE XII

Following the procedure of Example I, a mixture of dimethyl disulphide (4.57 g, 48.6 mmol) and pentadecafluoro-1-iodo-5-methylhexane (10.1 g, 20.3 mmol) on irradiation for 21 days, gave methyl pentadecafluoro-5-methylhexyl sulphide (6.76 g, 16.2 mmol) in 80 percent yield.

EXAMPLE XIII

Following the procedure of Example I, a mixture of dimethyl disulphide (7.52 g, 80.0 mmol) and heptadecafluoro-1-iodooctane (10.92 g, 20.0 mmol), on irradiation for 21 days, gave methyl heptadecafluoro-n-octyl sulphide (6.42 g, 13.8 mmol, 74 percent) (Found: C,23.2; H,0.8; S,7.2. $C_9H_3F_{17}S$ requires C,23.2; H,0.6; S,6.9 percent) b.p. 30°C at 1mm Hg.

EXAMPLE XIV

Following the procedure of Example I, a mixture of dimethyl disulphide (7.52 g, 80.0 mmol) and tridecafluoro-1-iodohexane (8.92 g, 20.0 mmol) on irradiation for 21 days, gave methyl tridecafluoro-n-hexyl sulphide (5.60 g, 15.30 mmol, 77 percent) (Found: C, 23.0; H,0.9; F,67.2. $C_7H_3F_{13}S$ requires C,23.0; H,0.8; F,67.5 percent) b.p. 131°–132°C.

EXAMPLE XV

Following the procedure of Example I, a mixture of nonadecafluoro-1-iodo-7-methyloctane (11,92 g, 20.0 mmol) and dimethyl disulphide (7.52 g, 80.0 mmol) was shaken and irradiated for 21 days. The non-volatile product was distilled from a semimicro distillation unit (25 ml) to afford methyl nonadecafluoro-7-methyloctyl sulphide (7.66 g, 14.85 mmol, 74 percent) (Found: C,23.4; H,0.6; F, 69.7; S,6.3. $C_{10}H_3F_{19}S$ requires C,23.3; H,0.6; F,69.9; S,6.2 percent) b.p. 185°186°C.

EXAMPLE XVI

Following the procedure of Example I, dimethyl disulphide (11.23 g 120 mmol) and tetrafluoro-1,2diiodoethane (10.36 g, 29.3 mmol) were irradiated for 30 days.

Fractional condensation of the products in vacuo followed by gas-liquid chromatographic separation of the combined −45° and −22°C fractions gave methyl tetrafluoro-2-iodoethyl sulphide (0.45 g, 1.64 mmol, 6 percent) and 1,2-bis (methylthio)tetrafluoroethane (2.60 g, 13.4 mmol, 46 percent) (Found: C,24.7; H, 3.3 S,32.7. $C_4H_6F_4S_2$ requires C, 24.7,; H, 3.3; S, 33.0 percent) b.p. 150°C.

Following the procedure of Example VII, a mixture of dimethyl disulphide (1.97 g, 21.0 mmol) and heptafluoro-1-iodopropane (5.80 g, 19.6 mmol) was heated at 150° (172 h) to afford methyl heptafluoro-n-propyl sulphide (0.54 g, 2.5 mmol) in 31 percent yield.

EXAMPLE XVII - A - FLOW-THROUGH SYSTEM REACTIONS.

a. 350°C, Pressure 25 cm Hg.

Pentafluoroidoethane (3.70 g, 15.1 mmol) and dimethyl disulphide (6.48 g, 69.0 mmol) passed (30 min.) through an unpacked Pyrex tube (i.d. 0.55 cm, heated length 4.5 m) at 350°C and a pressure of 25 cm Hg (contact time 14.5 sec) gave unchanged pentafluoroiodoethane (1.30 g, 5.3 mmol, 35 percent recovered) and methyl pentafluoroethyl sulphide (1.58 g, 9.5 mmol, 97 percent yield).

b. 400°C, Pressure 25 cm Hg.

Pentafluoroiodoethane (2.65 g, 10.8 mmol) and dimethyl disulphide (26.53 g, .2825 mol) passed through the reactor described in the previous experiment at 400°C (15 min.) at a pressure of 25 cm Hg (contact time ca. 2 sec) gave unchanged pentafluoroiodoethane (0.59 g, 2.4 mmol, 22 percent recovered) and methyl pentafluoroethyl sulphide (0.99 g, 6.0 mmol, 68 percent yield).

c. 420°C, Pressure 30 cm Hg.

Pentafluoroiodoethane (14.41 g, 59.0 mmol) and dimethyl disulphide (28.48 g, .304 mol) passed through the reactor described in experiment (a) at 420°C (110 min) at a pressure of 30 cm Hg (contact time ca. 13.5 sec) gave unchanged pentafluoroiodoethane (1.92 g, 7.8 mmol, 13 percent recovered) and methyl pentafluoroethyl sulphide (5.47 g, 33.0 mmol, 65 percent yield).

EXAMPLE XVIII

Trifluoroiodomethane (4.10 g, 21.4 mmol), sodium methanethiolate (1.73 g, 24.7 mmol), dimethyl disulphide (9.4g, 100 mmol) and solvent dimethyl sulphoxide (10 ml) were sealed in vacuo in a Pyrex tube (ca. 300 ml). The tube was shaken vigorously at 80°C for 22 hours. At the end of the reaction period the tube was opened and the volatile products subjected to fractional condensation in vacuo, followed by gas-liquid chromatographic separation of the −95°C fraction. This afforded methyl trifluoromethyl sulphide (2.01 g, 17.4 mmol) in 84 percent yield.

EXAMPLE XIX

Following the procedure of Example XVIII, a mixture of heptafluoro-1-iodopropane (2.55 g, 8.6 mmol), sodium methanethiolate (0.90 g, 12.8 mmol) and dimethyl disulphide (4.05 g, 43.0 mmol) in solvent dimethyl sulphoxide (6 ml) was reacted in a Pyrex tube (ca. 100 ml) at 105°C for 20 hours. Gas-liquid chromatographic separation of the −78°C fraction afforded methyl heptafluoro-n-propyl sulphide (1.38 g, 6.4 mmol) in 81 percent yield.

EXAMPLE XX

Following the procedure of Example XVIII, a mixture of heptafluoro-2-iodopropane (2.20 g, 7.4 mmol), sodium methanethiolate (1.01 g, 14.4 mmol) and dimethyl disulphide (4.87 g, 52.0 mmol) in solvent dimethyl sulphoxide (5 ml) was reacted in a Pyrex tube (ca. 100 ml) at 110°C for 20 hours. Gas-liquid chromatographic separation of the −78°C fraction afforded methyl heptafluoroisopropyl sulphide (0.50 g, 2.3 mmol) in 39 percent yield.

EXAMPLE XXI

Following the procedure of Example XVIII, a mixture of pentadeco-fluoro-1-iodo-5-methylhexane (7.94 g, 16.0 mmol), sodium methanethiolate (1.40 g, 20.1 mmol) and dimethyl disulphide (9.40 g, 100 mmol) in solvent dimethyl sulphoxide (15 ml) was reacted at 110°C for 41 hours. Gas-liquid chromatographic separation of the −22°C fraction afforded methyl pentadeca-fluoro-5-methylhexyl sulphide (3.98 g, 8.4 mmol) in 79 percent yield.

EXAMPLE XXII

A mixture of heptadecafluoro-1-iodooctane (10.92 g, 20.0 mmol), sodium methanethiolate (1.64 g, 23.4 mmol) and dimethyl disulphide (9.40 g, 100 mmol) in solvent dimethyl sulphoxide (10 ml) was reacted, as in Example XVIII at 110°C for 19 hours. The non-volatile material was treated with water (50 ml) and the lower fluorocarbon layer separated and then distilled under reduced pressure in a semimicro distillation unit to afford methyl heptadecafluoro-n-octyl sulphide (4.43 g, 9.88 mmol), b.p. 30°C at 1 mm Hg, in 74 percent yield.

EXAMPLE XXIII

Following the procedure of Example XXII, the same quantities of reactants and solvent reacted at 110°C for 46 hours afforded methyl heptadecafluoro-n-octyl sulphide (6.25 g, 13.4 mmol) in 86 percent yield.

EXAMPLE XXIV

Following the procedure of Example XVIII, a mixture of tridecafluoro-1-iodohexane (8.92 g, 20.0 mmol), sodium methanethiolate (1.49 g, 21.3 mmol) and dimethyl disulphide (9.40 g, 100 mmol) in solvent dimethyl sulphoxide (10 ml) was reacted at 110°C for 42 hours. Gas-liquid chromatographic separation of the −78°C fraction afforded methyl tridecafluoro-n-hexyl sulphide (4.43 g, 12.1 mmol) in 88 percent yield.

EXAMPLE XXV

Following the procedure of Example XVIII, a mixture of nonadecafluoro-1-iodo-7-methyloctane (11.92 g, 20.0 mmol), sodium methanethiolate (1.50 g, 21.5 mmol) and dimethyl disulphide (0.40 g, 100 mmol) in solvent dimethyl sulphoxide (25 ml) was reacted at 100°C for 42 hours. The non-volatile product was treated with water (100 ml) and the lower fluorocarbon layer was separated and then distilled from a semimicro distillation unit (25 ml) to afford methyl nonadecafluoro-7-methyloctyl sulphide (5.77 g, 11.2 mmol), b.p. 38°–40°C at 0.01 mm in 76 percent yield.

EXAMPLE XXVI

Following the procedure of Example XX, a mixture of heptafluoro-2-iodopropane (4.44 g, 15.0 mmol), sodium methanethiolate (1.19 g, 17.0 mmol) and dimethyl disulphide (7.06 g, 75.0 mmol) in solvent diglyme (10 ml), reacted at 110°C for 20 hours, afforded methyl heptafluoroisopropyl sulphide (0.49 g, 2.2 mmol) in 33 percent yield.

EXAMPLE XXVII

Following the procedure of Example XX, a mixture of heptafluoro-2-iodopropane (4.44 g, 15.0 mmol), sodium methanethiolate (1.19 g, 17.0 mmol) and dimethyl disulphide (7.06 g, 75.0 mmol) in solvent diglyme (10 ml), reacted at 110°C for 70 hours gave methyl heptafluoroisopropyl sulphide (0.70 g, 3.2 mmol) in 35 percent yield.

EXAMPLE XXVII

Following the procedure of Example XIX, a mixture of heptafluoro-1-iodopropane (4.44 g, 15.0 mmol), sodium methanethiolate (1.16 g, 16.6 mmol) and dimethyl disulphide (7.06 g, 75.0 mmol) in solvent diglyme (10 ml), reacted at 110°C for 60 hours, afforded methyl heptafluoro-n-propyl sulphide (1.76 g, 8.15 mmol) in 60 percent yield.

EXAMPLE XXIX

Following the procedure of Example XX, a mixture of heptafluoro-2-iodopropane (4.44 g, 15.0 mmol), sodium methanethiolate (1.19 g, 17.0 mmol) and dimethyl disulphide (7.06 g, 75.0 mmol) in solvent tetraglyme (10 ml), reacted at 110°C for 60 hours, afforded methyl heptafluoroisopropyl sulphide (0.69 g, 3.2 mmol) in 28 percent yield.

EXAMPLE XXX

Following the procedure of Example XVIII, a mixture of octafluoro-1,4-diiodobutane (4.54 g, 10.0 mmol), sodium methanethiolate (1.25 g, 18.3 mmol) and dimethyl disulphide (4.70 g, 50.0 mmol) in solvent dimethyl sulphoxide (6 ml) was reacted at 90°C for 16 hours. The non-voltaile material was treated with water (50 ml) and the lower fluorocarbon layer was removed and was separated by gas-liquid chromatography to afford 1,4-bis(methylthio)-octafluorobutane (0.67 g, 2.3 mmol) in 31 percent yield and methyl octafluoro-4-iodobutyl sulphide (1.38 g, 3.7 mmol) in 51 percent yield.

EXAMPLE XXXI

Following the procedure of Example XXX, the same quantities of reactants and solvent reacted at 85°C for 46 hours, afforded 1,4-bis(methyl-thio)-octafluorobutane (0.92 g, 3.1 mmol) in 35 percent yield and methyl octafluoro-4-iodobutyl sulphide (0.87 g, 2.15 mmol) in 24 percent yield.

EXAMPLE XXXII

Following the procedure of Example XVIII, a mixture of heptafluoro1-iodopropane (2.06 g, 6.9 mmol), sodium methanethiolate (0.54 g, 7.7 mmol) and dimethyl sulphide (2.82 g, 45.0 mmol) in solvent dimethyl sulphoxide (6 ml) was reacted at 90°C for 19 hours. Gas-liquid chromatographic separation of the −78°C fraction afforded methyl heptafluoro-n-propyl sulphide (0.82 g, 3.8 mmol) in 77 percent yield.

EXAMPLE XXXII - A

Heptafluoro-1-iodopropane (2.66 g, 9.0 mmol), sodium methane-thiolate (0.13 g, 1.8 mmol), dimethyl disulphide (8.46 g, 90.0 mmol), and dimethyl sulphoxide (10 ml), sealed in a Pyrex tube (ca. 100 ml) and shaken at 110°C (20 h), gave methyl heptafluoro-n-propyl sulphide (0.68 g, 3.13 mmol, 57 percent) and unchanged heptafluoro-1-iodopropane (0.94 g, 3.51 mmol, 39 percent recovered).

EXAMPLE XXXIII

Following the procedure of Example XXXII, a mixture of heptafluoro-1-iodopropane (1.89 g, 6.4 mmol), sodium methanethiolate (0.68 g, 9.7 mmol) and dimethyl sulphide (2.48 g, 40.0 mmol) in solvent dimethyl sulphoxide (10 ml), reacted at 110°C for 42 hours afforded methyl heptafluoro-n-propyl sulphide (0.32 g, 1.5 mmol) in 31 percent yield.

EXAMPLE XXXIV

Following the procedure of Example XXXII, a mixture of tridecafluoro-1-iodohexane (8.92 g, 20.0 mmol), sodium methanethiolate (1.48 g, 21.1 mmol) and dimethyl sulphide (6.20 g, 100 mmol) in solvent dimethyl sulphoxide (20 ml) was reacted at 100°C for 43 hours. Gas-liquid chromatographic separation of the −78°C fraction afforded methyl tridecafluoro-n-hexyl sulphide (4.17 g, 10.4 mmol) in 84 percent yield.

EXAMPLE XXXIV-A - SOLVENT FREE REACTION IN PRESENCE OF MERCAPTIDE ION

A mixture of $CF_3I$ (7 mmol) + $MeS^-Na^+$ (10 mmol) + $Me\ 2S_2$ (100 mmol) heated at 95°C (23 h) gave a 26 percent conversion of $CF_3I$ to $CF_3SMe$ (88 percent yield).

EXAMPLE XXXV

Methyl heptafluoropropyl sulphide (3.82 g, 17.7 mmol) was dissolved in glacial acetic acid (60 ml) contained in a round-bottomed flask which was fitted with a total reflux head maintained at −78°C. The flask was cooled in an ice-bath and potassium permanganate (4.18 g, 25.8 mmol), dissolved in the minimum quantity of hot water, was slowly added (1 h) with vigorous stirring. Stirring was continued (4 h) during which time the flask attained room temperature.

An aqueous solution of sodium metabisulphite was then added, to destroy the manganese dioxide formed in the reaction, and the product separated as a lower, liquid layer. This was removed with a dropping pipette, washed with aqueous sodium bicarbonate, and dried over a molecular sieve.

The residue in the flask was partially neutralized with aqueous sodium bicarbonate and extracted with either (3 × 100 ml). The ether extract was separated, neutralized as before, dried ($MgSO_4$), filtered, and the ether removed by distillation. The residual product was combined with that previously separated and distilled from a micro-distillation unit (5 ml) to give methyl heptafluoro-n-propyl sulphone, $CF_3 \cdot CF_2 \cdot CF_2 \cdot SO_2 \cdot CH_3$ (3.73 g, 15.0 mmol 85 percent) (Found: C, 19.5; H, 1.2. $C_4H_3F_7O_2S$ requires C, 19.3; H, 1.2 percent) b.p. 154°C.

EXAMPLE XXXVI

Methyl heptafluoroisopropyl sulphide (1.83 g, 8.5 mmol) and potassium permanganate (1.83 g, 11.5 mmol) were reacted, under the conditions described in Example XXV to give methyl heptafluoroisopropyl sulphone, $(CF_3)_2CF \cdot SO_2 \cdot CH_3$ (1.24 g, 5.0 mmol, 59 percent) (Found: C, 19.6; H, 1.3; F, 53.2. $C_4H_3F_7O_2S$ requires C, 19.14; H, 1.2; F, 53.6 percent) b.p. 152°C.

EXAMPLE XXXVII

Methyl pentadecafluoro-5-methylhexyl sulphide (2.04 g, 4.90 mmol) was dissolved in glacial acetic acid (10 ml) and the solution was heated with 100 volume hydrogen peroxide (10 ml) until the evolution of oxygen ceased. Two further portions of 100 volume hydrogen peroxide were added (2 × 10 ml) and the solution heated under reflux (16 h).

The resultant solution was neutralized with aqueous sodium bicarbonate and extracted with ether (2 × 20 ml). After separation the ether layer was dried ($M_gSO_4$), filtered, and the ether removed by distillation to leave a white solid. The solid was sublime twice in vacuo (60°) to give methyl pentadecafluoro-5-methylhexyl sulphone, $(CF_3)_2CF \cdot CF_2 \cdot CF_2 \cdot CF_2 \cdot SO_2 \cdot CH_3$ (1.82 g, 4.60 mmol), 83 percent) (Found: C, 21.2; H, 0.7; F, 63.6; S, 7.4. $C_8H_3F_{15}O_2S$ requires C, 21.4; H, 0.7; F, 63.6; S, 7.2 percent) m.p. 48°C.

EXAMPLE XXXVIII

Methyl nonadecafluoro-7-methyloctyl sulphide (3.61 g, 7.0 mmol) reacted with hydrogen peroxide in glacial acetic acid (as for the previous examples) gave methyl nonadecafluoro-7-methyloctyl sulphone $(CF_3)_2CF \cdot CF_2 \cdot CF_2 \cdot CF_2 \cdot CF_2 \cdot CF_2 \cdot SO_2 \cdot CH_3$ (3.42 g, 6.24 mmol), 89 percent) (Found: C, 22.2; H, 0.7; S, 5.9; F, 65.6. $C_{10}H_3F_{19}O_2S$ requires C, 21.9; H, 0.5; S, 5.8; F, 65.9 percent) m.p. 84°–85°C.

Methyl tridecafluoro-n-hexyl sulphide (3.66 g, 10.0 mmol) similarly reacted with hydrogen peroxide in glacial acetic acid gave methyl tridecafluoro-n-hexyl sulphone (3.53 g, 8.87 mmol, 89 percent) (Found: C, 21.3; H, 0.8; S, 8.3; F, 62.4. $C_7H_3F_{13}O_2S$ requires C, 21.1; H, 0.8; S, 8.0; F, 62.1 percent) m.p. 73°–74°C.

Methyl heptadecafluoro-n-octyl sulphide (3.73 g, 8.00 mmol) similarly reacted with hydrogen peroxide in glacial acetic acid gave methyl heptadecafluoro-n-octyl sulphone (3.14 g, 6.31 mmol, 79 percent) (Found: C, 22.0; H, 0.6; S, 6.7; F, 64.4. $C_9H_3F_{17}O_2S$ requires C, 21.7; H, 0.6; S, 6.4; F, 64.9 percent) m.p. 101°C.

EXAMPLE XXXIX

Methyl heptafluoro-n-propyl sulphone (3.04 g, 12.2 mmol) and an aqueous solution of sodium hypochlorite (ca. 80 ml, 14 percent w/v available chlorine) contained in a round-bottomed flask (100 ml), were stirred vigorously at room temperature (72 h).

The lower layer was separated with a dropping pipette, washed with water (2 × 5 ml), dried over a molecular sieve, and identified as trichloromethyl heptafluoro-n-propyl sulphone, $CF_3, CF_2 \cdot CF_2 \cdot SO_2 \cdot CCl_3$ (4.20 g, 12.0 mmol, 98 percent) (Found: C, 13.6; Cl, 30.1; $C_4Cl_3F_7O_2S$ requires, C 13.6; Cl, 30.2 percent) b.p. 172°C.

EXAMPLE XL

Following the procedure of Example XXXIX, methyl heptafluoroisopropyl sulphone (1.92 g, 7.74 mmol) was reacted with aqueous sodium hypochlorite to afford trichloromethyl heptafluoroisopropyl sulphone $(CF_3)_2$ $CF\cdot SO_2\cdot CCl_3$ (2.06 g, 5.85 mmol, 75 percent) (Found: C, 14.1; Cl, 29.9; F, 37.5. $C_4Cl_3F_7O_2S$ required C, 13.6; Cl, 30.1; F, 37.9 percent).

EXAMPLE XLI

Following the procedure of Example XXXIX, methyl pentadecafluoro-5-methylhexyl sulphone (0.98 g, 2.19 mmol) was reacted with aqueous sodium hypochlorite to afford trichloromethyl pentadecafluoro-5-methylhexyl sulphone $(CF_3)_2$ $CF\cdot(CF_2\cdot CF_2)_2\cdot SO_2\cdot CCl_3$ (0.98 g, 1.77 mmol, 81 percent) (Found: C, 17.4; Cl, 19.3. $C_8Cl_3F_{15}O_2S$ requires C, 17.7; Cl, 19.4 percent) m.p. 31°-2°C.

Methyl tridecafluoro-n-hexyl sulphone (1.00 g, 2.51 mmol) was similarly reacted with aqueous sodium hypochlorite to afford trichloromethyl tridecafluoro-n-hexyl sulphone (0.98 g, 1.95 mmol, 78 percent) (Found: C, 16.9; F, 49.0. $C_7F_{13}Cl_3O_2S$ requires C, 16.8; F, 49.3 percent) m.p. 18°-19°C.

EXAMPLE XLII

Methyl heptafluoro-n-propyl sulphone (2.32 g, 9.35 mmol), potassium permanganate (4.08 g, 27.0 mmol), and water (5 ml) were refluxed (24 h). Unreacted potassium permanganate was destroyed by addition of 100 volume hydrogen peroxide and the resultant suspension filtered through glass wool. The filtrate was neutralized with hydrochloric acid and evaporated to dryness. The solid residue was extracted with ethanol, filtered, and again evaporated to dryness to leave a white solid. This was dried over phosphoric oxide and identified as potassium heptafluoropropanesulphonate $CF_3\cdot CF_2\cdot CF_2\cdot SO_3K$ (2.29 g, 7.93 mmol, 85 percent) (Found C, 12.3; S, 11.0. $C_3F_7KO_3S$ requires C, 12.5; S, 11.1 percent) m.p. 288°C. After identification part of the potassium salt was converted quantitatively into the free acid: $CF_3\cdot CF_2\cdot CF_2\cdot SO_3H$.

Methyl tridecafluoro-n-hexyl sulphone (1.39 g, 3.50 mmol) refluxed (20 h) with aqueous potassium permanganate similarly afforded potassium tridecafluoro-n-hexane sulphonate (1.13 g, 2.58 mmol, 74 percent) (Found: C, 16.5; S, 7.4; F, 55.9. Calc. for $C_6F_{13}O_3SK$: C, 16.4; S, 7.3; F, 56.4 percent) m.p. 272°C.

Methyl heptadecafluoro-n-octyl sulphone (1.99 g, 4.00 mmol) refluxed (24 h) with aqueous potassium permanganate similarly afforded potassium heptadecafluoro-n-octanesulphonate (1.47 g, 2.73 mmol, 68 percent) (Found: C, 18.1. Calc. for $C_8F_{17}O_3SK$: C, 17.8 percent) m.p. 284°C.

Methyl nonadecafluoro-7-methyloctyl sulphone (1.64 g, 3.00 mmol) was refluxed (24 h) with aqueous potassium permanganate to afford potassium nonadecafluoro-7-methyloctanesulphonate (1.42 g, 2.42 mmol, 81 percent) (Found: C, 18.4; S, 5.4; F, 61.4. $C_9F_{19}O_3SK$ requires C, 18.2; S, 5.7; F, 61.4 percent) m.p. 248°-249°C.

EXAMPLE XLIII

Trichloromethyl heptafluoro-n-propyl sulphone (1.97 g, 5.60 mmol), aqueous 2M potassium hydroxide (8.0 ml, 16 mmol) and dioxane (10 ml) were heated at 100°C in a sealed Pyrex tube (ca. 80 ml) for 7 days.

At the end of the reaction period volatile materials were vented and the white solid remaining in the tube extracted with water, neutralized with hydrochloric acid and evaporated to dryness. The resultant solid was extracted with acetone and the extract evaporated to dryness to yield a white solid which was redissolved in acetone and precipitated with chloroform. The precipitated solid was identified as potassium heptafluoropropanesulphonate (1.16 g, 4.02 mmol) in 72 percent yield. The potassium salt was readily converted to the free acid.

Trichloromethyl tridecafluoro-n-hexyl sulphone (0.60 g, 1.19 mmol) reacted with aqueous 2M potassium hydroxide in the presence of solvent dioxane similarly gave potassium tridecafluoro-n-hexanesulfonate (0.39 g, 0.89 mmol) in 75 percent yield.

We claim:

1. The process for preparing a fluoroalkyl sulphide of the formula $R_fSR$ which comprises reacting, within the temperature range of 150°–450°C., a fluoroiodoalkane of the formula $R_fI$ with a dialkyl sulfide, RSR, or dialkyl disulfide, RSSR, where $R_f$ is a fluoroalkyl or fluoroiodoalkyl radical having from one to 30 carbon atoms, and R is an alkyl radical having from one to six carbon atoms.

2. The process of claim 1 wherein $R_f$ is a perfluoroalkyl having one to 15 carbon atoms.

3. The process of claim 1 wherein R is lower alkyl.

4. The process of claim 1 wherein R is methyl.

5. The process according to claim 1 wherein reaction temperature is in the range of 160° to 200°C.

6. The process for preparing a fluoroalkyl sulphide of the formula $R_fSR$ which comprises reacting, within the temperature range of 25°–100°C, while exposing the reactants to ultraviolet light irradiation, a fluoroiodoalkane of the formula $R_fI$ with a dialkyl sulfide, RSR, or dialkyl disulfide, RSSR, where $R_f$ is a fluoroalkyl or fluoroiodoalkyl radical having from one to 30 carbon atoms, and R is an alkyl radical having from one to six carbon atoms.

7. The process of claim 6 wherein $R_f$ is perfluoroalkyl having one to 15 carbon atoms.

8. The process of claim 6 wherein R is lower alkyl.

9. The process of claim 6 wherein R is methyl.

10. The process for preparing a fluoroalkyl sulphide of the formula $R_fSR$ which comprises reacting, within the temperature range of 50°–150°C, a fluoroiodoalkane of the formula $R_fI$ with a dialkyl sulfide, RSR, or dialkyl disulfide, RSSR, and an alkali metal alkanethiolate of the formula $RS^-M^+$ where $R_f$ is a fluoroalkyl or fluoroiodoalkyl radical havin from one to 30 carbon atoms, R is an alkyl radical having from one to six carbon atoms, and M is an alkali metal.

11. The process of claim 10 wherein R is methyl.

12. The process of claim 11 wherein M is sodium.

13. The process of claim 10 wherein $R_f$ is perfluoroalkyl having one to 15 carbon atoms.

14. The process of claim 10 wherein R is lower alkyl.

15. The process of claim 10 wherein R is lower alkyl and M is sodium.

* * * * *